(12) United States Patent
Goel et al.

(10) Patent No.: US 8,870,056 B2
(45) Date of Patent: Oct. 28, 2014

(54) MULTI-USE WIRELESS DISPLAY TAG INFRASTRUCTURE AND METHODS

(75) Inventors: Anurag Goel, Pleasanton, CA (US); Mark Douglas McDonald, Campbell, CA (US); Sunit Saxena, Monte Sereno, CA (US); Jih-lung Wang, San Jose, CA (US)

(73) Assignee: Altierre Corporation, San Jose, CA (US)

( * ) Notice: Subject to any disclaimer, the term of this patent is extended or adjusted under 35 U.S.C. 154(b) by 168 days.

(21) Appl. No.: 13/070,016

(22) Filed: Mar. 23, 2011

(65) Prior Publication Data
US 2011/0169715 A1 Jul. 14, 2011

Related U.S. Application Data

(62) Division of application No. 12/035,402, filed on Feb. 21, 2008, now Pat. No. 8,070,062, which is a division of application No. 11/019,916, filed on Dec. 20, 2004, now Pat. No. 7,413,121.

(60) Provisional application No. 60/530,791, filed on Dec. 18, 2003, provisional application No. 60/530,785, filed on Dec. 18, 2003, provisional application No. 60/530,794, filed on Dec. 18, 2003, provisional application No. 60/530,820, filed on Dec. 18, 2003, provisional application No. 60/530,788, filed on Dec. 18, 2003.

(51) Int. Cl.
*G06F 17/00* (2006.01)
*G06Q 20/20* (2012.01)
*G07G 1/01* (2006.01)
*G06Q 30/02* (2012.01)
*G07G 1/00* (2006.01)

(52) U.S. Cl.
CPC .............. *G07G 1/009* (2013.01); *G06Q 20/201* (2013.01); *G07G 1/01* (2013.01); *G06Q 30/0267* (2013.01); *G06Q 30/02* (2013.01); *G06Q 30/0248* (2013.01); *G06Q 30/0273* (2013.01)
USPC .......................................... 235/375; 340/10.3

(58) Field of Classification Search
USPC .................... 235/492, 375; 340/572.1–572.9, 340/10.1–10.6
See application file for complete search history.

(56) References Cited

U.S. PATENT DOCUMENTS 3,609,741 A  9/1971 Miller
4,303,910 A  12/1981 McCann
(Continued)

FOREIGN PATENT DOCUMENTS

JP  A-2002-1989223  7/2002

OTHER PUBLICATIONS
PCT/US04/142956 International Search Report, Dated Jan. 5, 2007 (6 pages).
(Continued)

*Primary Examiner* — Jamara Franklin
(74) *Attorney, Agent, or Firm* — DLA Piper LLP (US)

(57) ABSTRACT

A multiuse system for use with Wireless Display Tags (WDTs) includes, in one or more exemplary arrangements, techniques for automatically maintaining synchronicity between pricing data for a product and advertising, marketing or promotional data associated with that product, and for detecting the proximity and location of a customer within a category of goods displayed within a managed environment. A messaging format suitable for such low power operation among a large number of peers is also disclosed, as is a technique for integrating a plurality of smaller displays to yield a single large display. An access point capable of serving as a communications hub within such a network, while at the same time offering visual and audio surveillance capabilities, is also disclosed.

7 Claims, 6 Drawing Sheets

(56) References Cited

U.S. PATENT DOCUMENTS

| | | | |
|---|---|---|---|
| 4,673,932 A | 6/1987 | Ekchian et al. | |
| 4,740,779 A | 4/1988 | Cleary et al. | |
| 4,888,709 A | 12/1989 | Revesz et al. | |
| 4,896,319 A | 1/1990 | Lidinsky et al. | |
| 5,151,684 A | 9/1992 | Johnsen | |
| 5,241,467 A | 8/1993 | Failing et al. | |
| 5,510,602 A | 4/1996 | Evans et al. | |
| 5,539,393 A | 7/1996 | Barfod | |
| 5,668,560 A | 9/1997 | Evans et al. | |
| 5,686,902 A | 11/1997 | Reis et al. | |
| 5,797,132 A | 8/1998 | Altwasser | |
| 5,821,523 A | 10/1998 | Bunte et al. | |
| 5,838,720 A * | 11/1998 | Morelli | 375/219 |
| 5,873,025 A | 2/1999 | Evans et al. | |
| 5,910,653 A | 6/1999 | Campo | |
| 5,943,654 A | 8/1999 | Goodwin et al. | |
| 6,058,292 A | 5/2000 | Terreault | |
| 6,253,190 B1 | 6/2001 | Sutherland | |
| 6,269,342 B1 | 7/2001 | Brick et al. | |
| 6,307,919 B1 | 10/2001 | Yoked | |
| 6,340,958 B1 | 1/2002 | Cantu et al. | |
| 6,420,961 B1 | 7/2002 | Bates et al. | |
| 6,662,165 B1 | 12/2003 | Saliceti et al. | |
| 6,715,675 B1 | 4/2004 | Rosenfeld | |
| 6,844,821 B2 | 1/2005 | Swartzel et al. | |
| 7,178,722 B2 | 2/2007 | Do et al. | |
| 2002/0042741 A1 | 4/2002 | Wilson, III et al. | |
| 2002/0122467 A1 | 9/2002 | Camp, Jr. et al. | |
| 2003/0104848 A1 | 6/2003 | Brideglall | |
| 2005/0025218 A1 | 2/2005 | Briles | |
| 2005/0057341 A1 | 3/2005 | Roesner | |

OTHER PUBLICATIONS

PCT/US04/42956 International Written Opinion, Dated Jan. 5, 2007 (6 pages).

PCT/US2004/042956 International Preliminary Report, Dated Feb. 28, 2007 (7 pages).

* cited by examiner mxn display unit

MULTI-USE WIRELESS DISPLAY TAG INFRASTRUCTURE AND METHODS

PRIORITY CLAIMS/RELATED APPLICATIONS

This application claims the priority under 35 USC 120 and is a divisional of U.S. patent application Ser. No. 12/035,402, filed on Feb. 21, 2008 which in turns claim priority under 35 USC 120 and is a divisional of Ser. No. 11/019,916 filed on Dec. 20, 2004, which in turn claims priority under 35 U.S.C. 119(e) to the following U.S. provisional applications: U.S. Patent Application No. 60/530,791 filed Dec. 18, 2003 entitled "RF Network"; U.S. Patent Application No. 60/530,785 filed Dec. 18, 2003 entitled "Category-Specific Customer Location"; U.S. Patent Application No. 60/530,794 filed Dec. 18, 2003 entitled "Real-Time In-Concert Delivery of Category-Level Price, Advertising, Marketing, and Promotions in Retail Environments"; U.S. Patent Application No. 60/530,820 filed Dec. 18, 2003 entitled "Cost-Effective Method to Combine Multiple Small-Display Units into a Large Display Unit"; U.S. Patent Application No. 60/530,788 filed Dec. 18, 2003 entitled "Access Point for a Wireless Display Tag (WDT) Network".

This application is also related to the following US utility applications filed simultaneously herewith, assigned to the same assignee as the present invention, and incorporated herein by reference in full: U.S. patent application Ser. No. 11/019,978, filed Dec. 20, 2004 entitled "Wireless Display Tag Unit"; U.S. patent application Ser. No. 11/019,916, filed Dec. 20, 2004 entitled "Multiuser Wireless Display Tag Infrastructure and Methods"; U.S. patent application Ser. No. 11/019,976, filed Dec. 20, 2004 entitled "Active Backscatter Wireless Display Terminal"; U.S. patent application Ser. No. 11/019,705, filed Dec. 20, 2004 entitled "Low Power Wireless Display Tag (WDT) Systems and Methods"; and U.S. patent application Ser. No. 11/019,494, filed Dec. 20, 2004 entitled "RF Backscatter Transmission with Zero DC Power Consumption"; and U.S. patent application Ser. No. 11/019,660, filed Dec. 20, 2004, entitled "An Error Free Method for Wireless Display Tag."

FIELD

The present invention relates to electronic inventory systems adapted for use with electronic shelf labels, and more particularly relates to systems and methods for enabling communication among such shelf labels and a host system, including networks and systems which are adapted for wireless communication.

BACKGROUND

Referring to FIG. 1, retail stores typically display pricing information on paper labels located on shelf edges (shelf labels); FIG. 1 shows an example of a typical printed shelf label. Shelf labels are fitted into C-shaped channels at the edge of product display shelves. Typically, an in-store computer-based printing system downloads "Price Files" from a central location, such as a Retail Chain Headquarters. The information in Price Files is printed on shelf labels and these new shelf labels are manually inserted into the shelf C-channels, usually on a weekly basis. A typical large retail store must update thousands of shelf labels each week.

Referring now to FIG. 2, some Electronic Shelf Labels (ESL) 10 have been produced in an effort to automate the shelf labeling process. As shown in FIG. 4, ESLs 10 display basic price information on a segmented liquid crystal display (LCD).

Referring to FIG. 2, ESLs 10 may receive display information by infrared (IR) or radio frequency (RF) communication 12. Current ESLs 10 often use unidirectional communications techniques to transmit data from the in-store computer-based pricing system to the deployed ESLs 10. Some ESLs 10 are capable of bidirectional communication, allowing the deployed ESLs 10 to send information or requests to the in-store computer system 14. Communication between an in-store computer system 14 and the deployed ESLs 10 is facilitated by one or more access points 16. Access points 16 are often located in the ceilings of the store.

Prior art display tags have suffered other limitations, as well. Typical prior art has no ability to provide a display larger than a single shelf-edge device. Likewise, the prior art is unable to provide pricing and Advertising, Marketing and Promotion ("AMP") in synchronicity and without significant lag time. Still further, existing RFID devices are unable to sense the presence of a customer, nor to communicate information to devices which may be carried by a customer.

Thus there has been a need for an RFID system which resolves the foregoing limitations of the prior art in cost-effective manner.

SUMMARY OF THE INVENTION

The present invention provides a plurality of techniques and systems which optimize operation of RFID devices to provide marketing capabilities and information management which extend well beyond that offered in the prior art.

In particular, the present invention provides methods and techniques for managing and synchronizing AMP information with pricing information. In addition, the present invention provides the ability to sense the presence of a customer near a Wireless Display Tag (WDT). Further, the present invention provides the ability to configure an RF network with a large number of peers, capable of operating with various RF protocols and having ultra low-power active radio characteristics which avoids impediments to radio wave propagation typically occurring in a retail or other managed environment.

The present invention also provides the ability to combine a plurality of WDTs into a single cohesive display for displaying messages or other data too large to be displayed on a single device. Finally, the present invention also provides an access point capable of providing security surveillance features.

It will be appreciated that not all of the foregoing aspects of the present invention are required to be implemented in each embodiment, and thus various implementations may include selected aspects of the invention to provide solutions which are optimized for each particular application of the system and WDT of the present invention.

DETAILED DESCRIPTION OF ONE OR MORE EMBODIMENTS

Figure 1:
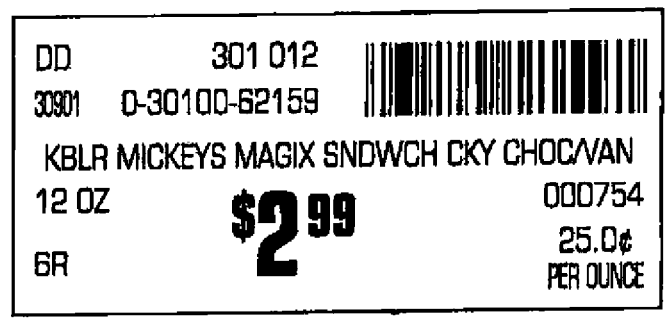
FIG. 1 shows a prior art example shelf label printed on paper.
Figure 2:
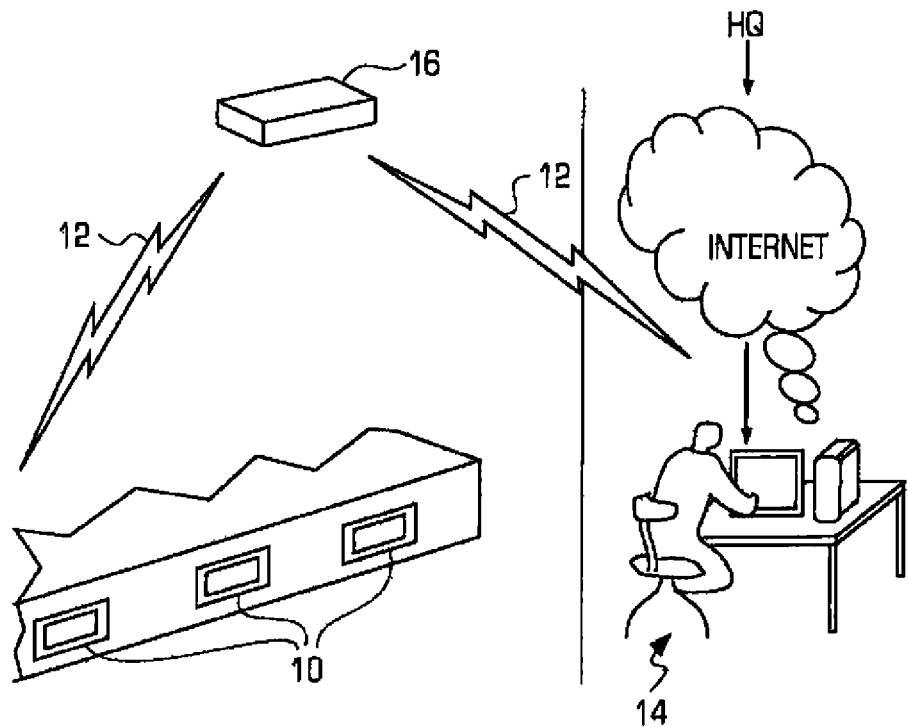
FIG. 2 illustrates a prior art RFID device.
Figure 3:
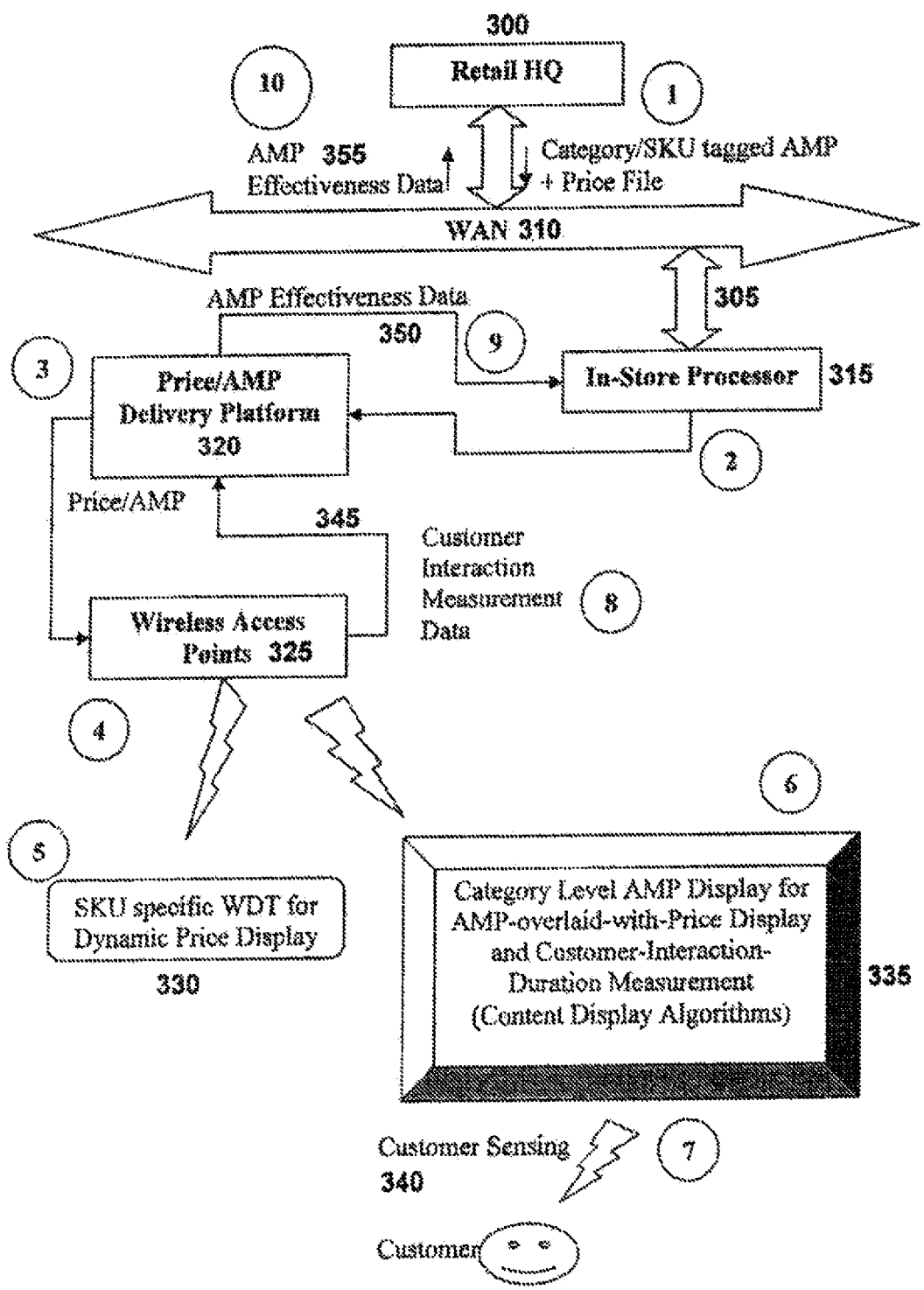
FIG. 3 illustrates a method of providing Category/SKU tagged AMP data together with pricing information.

Referring first to FIG. 3, a system and method for delivering AMP information synchronized together with pricing information is illustrated, whereby in-concert delivery of Pricing and AMP may be achieved. In an exemplary arrangement, Pricing and AMP digital contents are maintained at a server as shown at 300, and are delivered at step 305 from such one or more central locations via Wide Area Networks (WAN) 310 to a retail store's In Store Processor (ISP) 315. The ISP 315 transmits Pricing and AMP to a Pricing/AMP delivery platform where they are multiplexed appropriately and delivered, for example by Wireless Access Points 325, to category-level display devices over a Local Area Network (LAN) that can be either wired or wireless. The category level display devices for pricing are shown at 330, and typically comprise a WDT located on a shelf edge or similar location, whereas the AMP display may be any suitable display 335.

The current invention therefore improves upon existing methods of Pricing and AMP delivery in that Pricing/AMP content with the current invention always stays synchronized. There is no lag between the design of Pricing/AMP content and its delivery to the customer since digital transport is used for content delivery, and the Pricing/AMP is delivered directly at the category level at the shelf-edge in a store, or, stated differently, the point of purchase ("POP").

In an additional feature of this aspect of the present invention, methods are provided for measuring the number of impressions of each AMP campaign over a given period of time and providing a direct correlation between AMP delivered and purchase decisions. To achieve this, the digital Advertising content includes "Price Markers" (similar to a tag or attribute) where Promotional Pricing can be inserted digitally at the local store level. The Retail HQ 300 tags advertising content with category and Stock Keeping Unit (SKU) markers and sends it down over WAN to the local stores' ISPs along with Price Files for each store, again as described above.

At the local retail store or other managed environment, the present invention multiplexes the category/SKU-tagged-advertising content with the appropriate SKU-specific pricing information and sends it, via a LAN, to an AMP station at the proper category and aisle location. At the AMP station 335, the Altierre Software displays the downloaded content based on content/display length/display frequency algorithms, or other suitable criteria. The AMP and Pricing are now displayed synchronously.

The foregoing cycle is repeated every time there is a change in advertising content and/or price file content.

Figure 4:
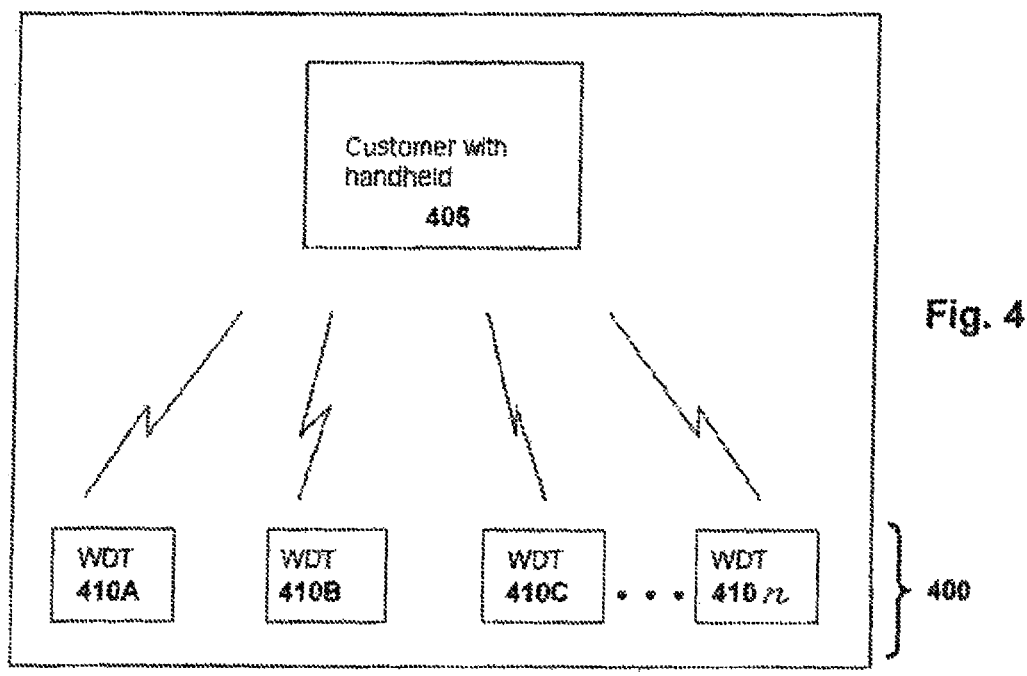
FIG. 4 shows a system for sensing the presence of a customer proximate to one or more WDTs.
Figure 5:
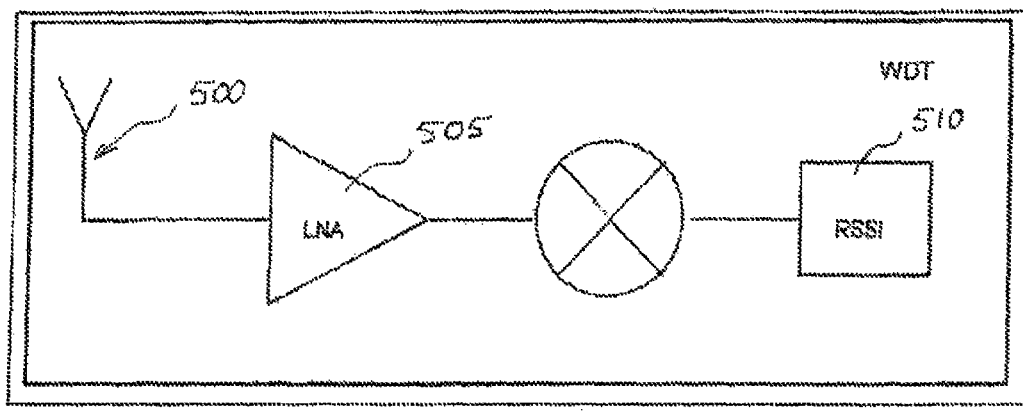
FIG. 5 shows a circuit design for a WDT which includes the ability to sense the presence of a customer in proximity to the WDT.

The category level AMP stations 335 may also be equipped, in at least some embodiments, with RF sensors 340 that detect proximity of customers that either have RF transceiver equipped shopping cart or an RF smart card, or other suitable device which identifies the presence of a customer. The AMP station can thus detect, time-domain correlate and record how long a customer stopped in front of a particular ad, as shown at 335. This information is then correlated with sales data from the POS and sent back periodically to the Retail HQ, as shown at links 345, 350 and 355. This provides a scientific effectiveness measurement of AMP campaigns by a store or other managed environment. Referring next to FIGS. 4 and 5, another aspect of the present invention may be better appreciated, by which the presence of a customer may be sensed without the customer's use of a smart card or a transceiver-equipped shopping cart or a category-level AMP station. An alternative embodiment to using RF is to sense the customer's heat (through IR, infrared), capacitive charge, or visually, e.g. with a camera. Under the invention, WDTs as described in the related applications are spaced in a predictable arrangement, which may for example form a grid 400. The spacing between WDTs can be quite small, for example on the order of a few inches or less. As a customer with a suitable transmitter, shown at 405 in FIG. 4, walks past, the WDTs 4105A-410n within the immediate vicinity detect the signal from the customer's transmitter, in effect detecting the presence of the customer. That detection signal may then be transmitted to the central receiving station for data collection purposes. A suitable transmitter may be a handheld-device, such as a PDA or cell phone, or a specially-configured shopping cart. The transmission from the central receiving station to the customer's handheld device, after sensing customer presence, is two-way direct with the need for involvement by the WDT; for example, the PDA may be providing information to the consumer for the shopping trip, or giving marketing information to the consumer.

As shown in FIG. 5, the detected signal from the consumer is received on the antenna 500 of the WDT, and is amplified by a suitable low-noise amplifier 505 within the WDT. The signal may then be quantized by a Received Signal Strength Indicator ("RSSI") circuit 510 in each WDT receiver. A RSSI outputs a voltage or current amplitude that is logarithmically proportional to the input RF signal power. That value is sent back to the central computer. The highest value indicates the consumer is closest to that WDT, and can be confirmed by the relative signal strengths from the outlying WDTs. Since each WDT's location within the grid 400 is known, then the consumer's location is known. Although it may be impossible to know what the consumer is looking at, the category of items the consumer is closest to is certainly known. It will also be appreciated that the WDTs and handhelds do not add any extra cost since they are already present within the contemplated store configuration.

The communication between the handheld and WDT can be via RF active radio, RF backscatter, IR, or bar-code reader. It will be appreciated that such a communications network may be comprised of a large number of peers. One example of such a network may be an RF network, in which case it will be important that the RF network be compatible with a number of RF protocols which may, for example, include ultra-low-power active radio, RF backscatter radio, RF backscatter radio meeting the MIT Auto-ID standards, or IEEE 802.11 standard radio.

Figure 6:
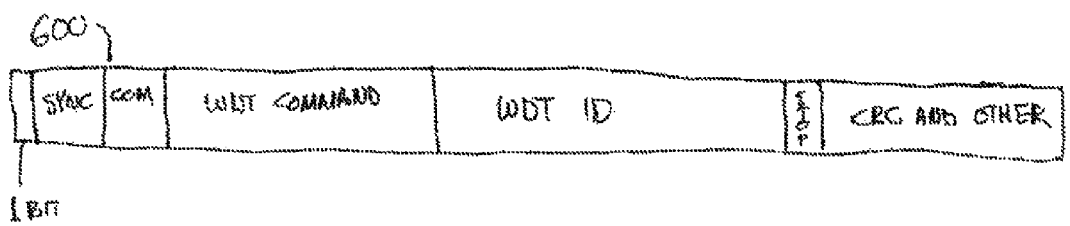
FIG. 6 shows an exemplary message format for an RF network in accordance with the present invention.

Depending on the implementation, ultra low-power active radio characteristics may include a star network configuration with a very large number of peers (e.g., >10,000), a simple modulation type to minimize power consumption, a constant envelope modulation to increase power amplifier efficiency, and a small packet length, to minimize power consumption. One example of a message configuration for such a system is shown in FIG. 6, where the message 600 may have one initial bit, sixteen sync bits, ten command bits, 128 WDT command bits, 256 WDT ID bits, one stop bit, and 100 CRC and other bits.

Such a system is optimized for low-power peer transceivers, including low bit rate to minimize bandwidth requirements; for example, on the order of 200 Kbps. Lower bandwidth requirements results in greater dynamic range, which can be traded off for reduced slave radio performance. In addition, a listen-before-transmit protocol may be implemented, as well as an acknowledgement. Still further, the active receivers can minimize power consumption by limiting the "on" time of the active devices, and by turning on the active devices for only short periods compared to the bit time, as taught in the copending applications.

The foregoing approach is also capable of avoiding the impediments to radio-wave propagation typically found in a retail environment. The noise caused by the harmonics of fluorescent lighting can be avoided by using a suitable high bit rate, typically higher than the frequency of the noise. Reflections caused by shopping carts, shipping palettes, and so forth are compensated for with spread-spectrum technology. Excessive radio signal loss, which may also be caused by shopping carts or palettes, can be accommodated by identifying, at least periodically, those WDTs that do not respond.

Figure 7:
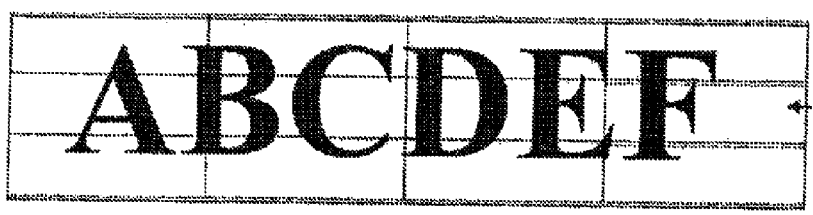
FIG. 7 illustrates in block diagram form a plurality of WDTs configured to provide a single large display.

In another aspect of the invention, particularly useful for, for example, displaying AMP information, a plurality of WDTs may be used to provide a single large display. Referring next to FIG. 7, a technique is shown for coordinating multiple integrated m.times.n display driving devices to drive a larger M.times.N display unit without an external driver or other separately designed integrated circuits. For example, in FIG. 7, a 4.times.3 grid of bitmapped displays 700A-M may be integrated to display "ABCDEF".

For the multiple units 700A-M to display the required pattern, the units are arranged in a predetermined configuration, with each unit receiving in its memory a portion of the bit image of the larger image. As taught in the copending applications, the individual display units may receive their portion of the overall data either individually or through a shared receiver. Each unit then displays their own portion of the image on the display in a coordinated manner. The combined image will be perceived by the viewer as a larger display unit.

Note that the large display can be composed of small display unit physically placed side-by-side, or combine the display driving signals of each small unit in the logical fashion that perform the driving signals for a large integrated display.

There is no limit to the size of display this invention can support, the only limiting factor will be the electrical driving capability that the whole display system can provide. In addition, this aspect of the present invention will work on any bit mapped display devices.

Figure 8:
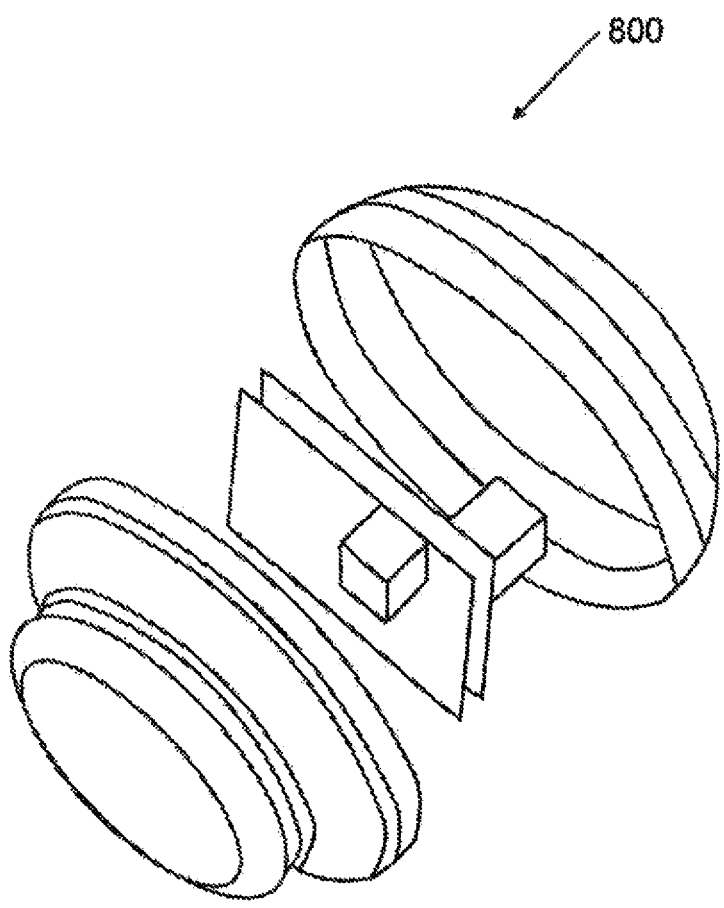
FIG. 8 illustrates an access point with security surveillance capabilities.

Referring next to FIG. 8 of the present invention, an access point is illustrated which also provides security surveillance features. In a number of implementations of the present invention, the Access Point ("AP") 800 is the communication hub of this technology The AP enables two-way communication between the thousands of WDTs (Wireless Display Tags) which may be disposed within a given area and the central computer system for that network, ultimately enabling communications within an entire multi-store system. In a typical configuration, the AP may be either hard-wired or RF connected to the central computer and RF connected to the WDTs and local PDAs. It also contains a video camera and microphone listening device for security surveillance.

Having fully described an exemplary embodiment of the invention, together with numerous alternatives and equivalents, it will be apparent to those skilled in the art that numerous additional alternatives and equivalents also exist which do not depart from the present invention. As a result, the foregoing description is for purposes of illustration, and the invention is to be limited only by the appended claims.

The invention claimed is:

1. A message format optimized for low-power active radio applications having large numbers of peers, comprising:
   a message having a small packet length; a low bit rate; a low bandwidth requirement; and a short on time compared to bit time; and
   the message having one or more wireless display tag command bits.

2. The message format of claim 1, wherein the message has a modulation type that minimizes power consumption of a wireless display tag that receives the message.

3. The message format of claim 1, wherein the message has a constant envelope modulation to increase an efficiency of a power amplifier in a wireless display tag that receives the message.

4. The message format of claim 1, wherein the message has sixteen sync bits and ten command bits.

5. The message format of claim 1, wherein the one or more wireless display tag command bits are 128 bits.

6. The message format of claim 4, wherein the message has one or more wireless display tag identifier bits.

7. The message format of claim 4, wherein the one or more wireless display tag identifier bits are 256 bits.

* * * * *